Feb. 23, 1971 — W. SEATTS — 3,564,878

TRANSMISSION LOCKING MEANS

Filed Jan. 22, 1969 — 4 Sheets-Sheet 1

INVENTOR
William Seatts
BY Polachek & Saulsbury
ATTORNEYS

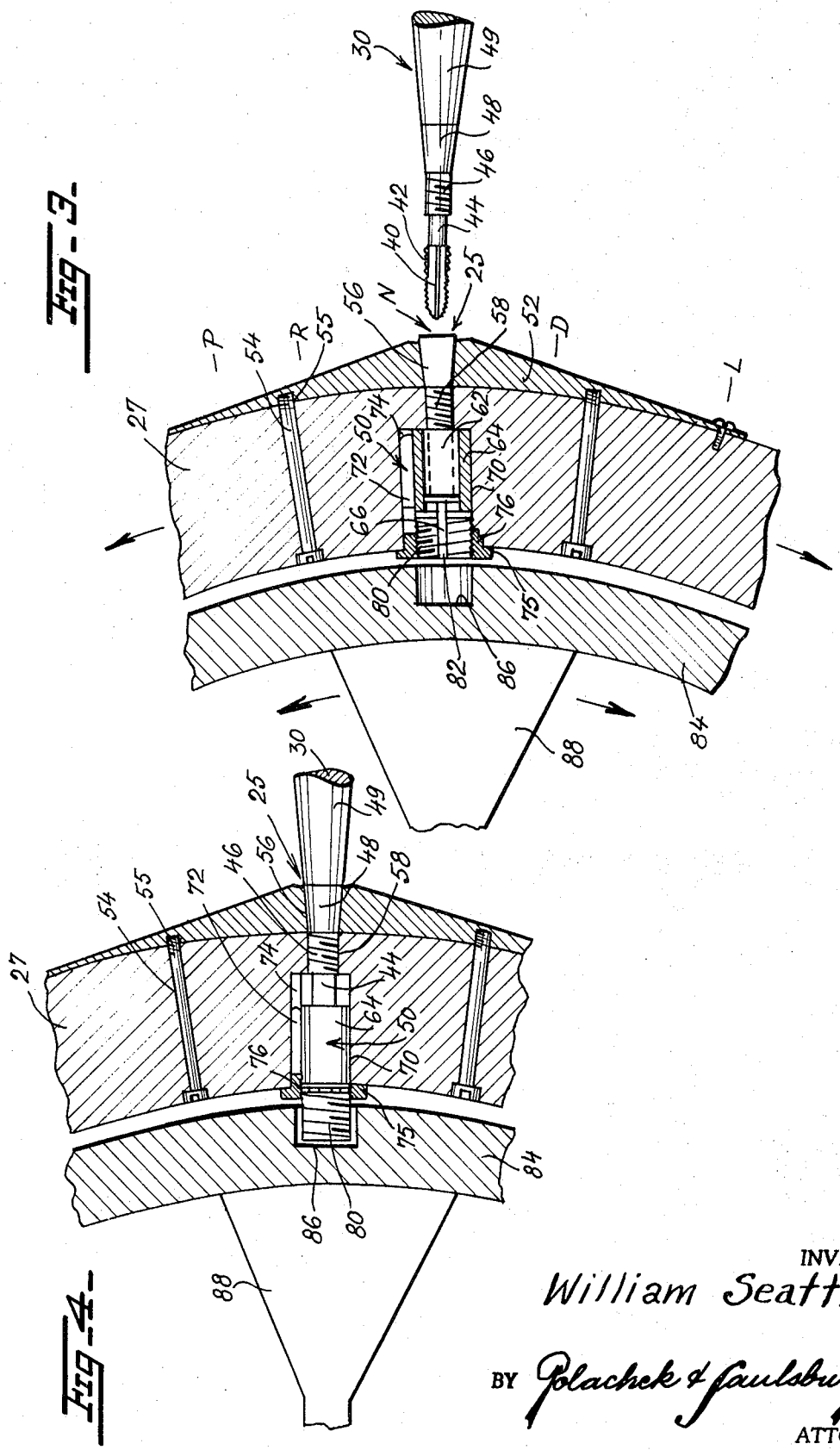

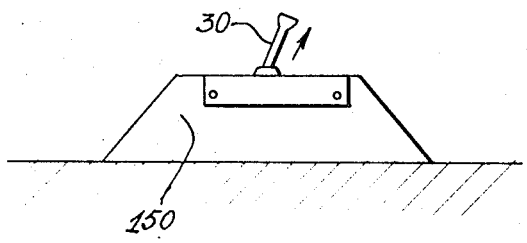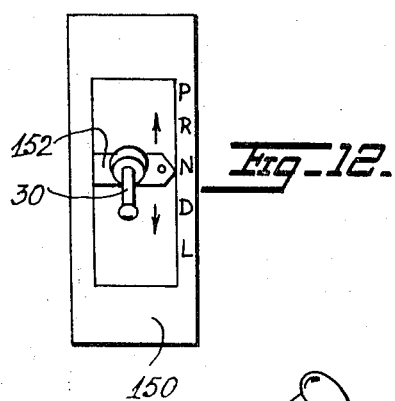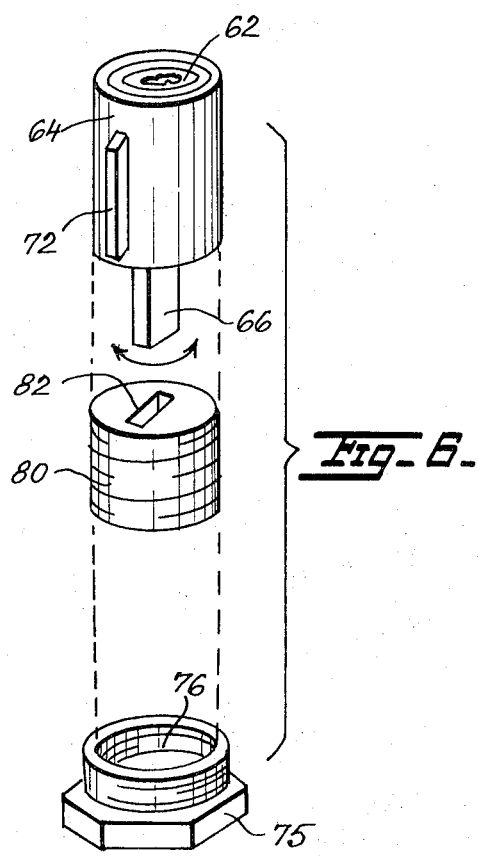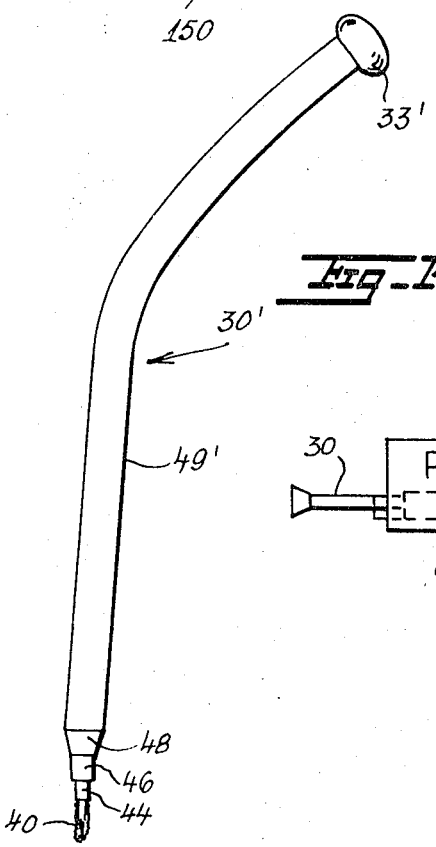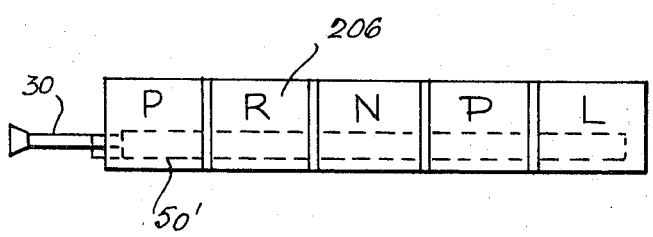

Feb. 23, 1971  W. SEATTS  3,564,878
TRANSMISSION LOCKING MEANS
Filed Jan. 22, 1969  4 Sheets-Sheet 4
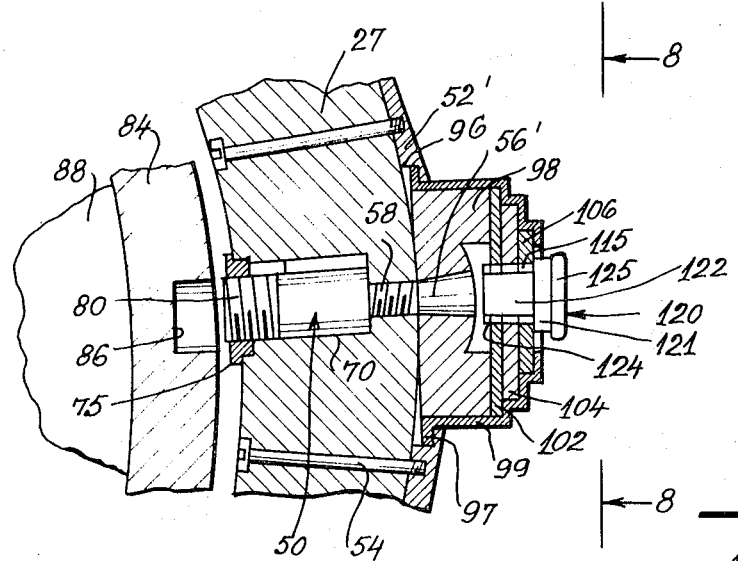
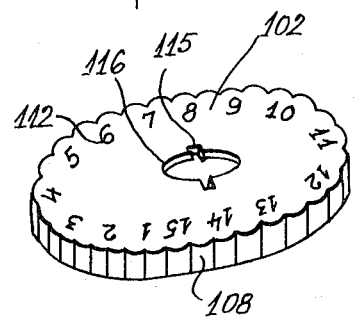
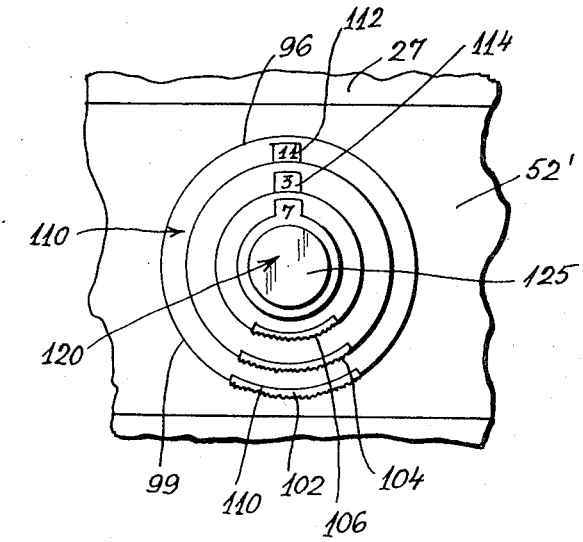
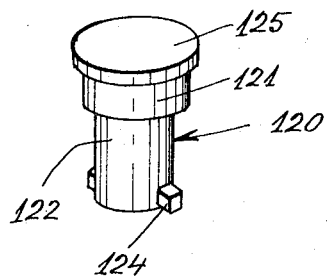
INVENTOR
*William Seatts*
BY *Polachek & Saulsbury*
ATTORNEYS

United States Patent Office 3,564,878
Patented Feb. 23, 1971

3,564,878
TRANSMISSION LOCKING MEANS
William Seatts, 60 Clarkson Ave., Apt. 3–J,
Brooklyn, N.Y. 11226
Filed Jan. 22, 1969, Ser. No. 793,002
Int. Cl. B60r 25/06; E05b 35/06, 65/12
U.S. Cl. 70—204                                5 Claims

ABSTRACT OF THE DISCLOSURE

A cylinder lock is installed in a rotating shifter collar on a steering post. A removable transmission shift lever or handle is provided with a key at one end which fits into the cylinder lock. The lever has a threaded section which screws into the shifter collar. The cylinder lock can be installed in a transmission console on the floor of a vehicle or in a transmission push button assembly. A dial combination lock and plug can be provided on the shifter collar to conceal and protect the cylinder lock.

---

The invention concerns an improved transmission locking means for a vehicle.

Heretofore, gear shift locking devices in vehicles have employed locks opened and closed by use of keys separate from the gear shift levers. If an unauthorized person obtained a proper key or managed to pick the lock the transmission could be shifted to operate the vehicle. In some prior locking transmissions the shift lever was removable. However, any other shift lever could be substituted in its place.

In the present invention by contrast, the gear shift lever or handle also includes a key to operate the lock of the shifting apparatus. The gear shift can be locked and the gear shift lever or handle removed, even while the motor is running. The lever is provided with a removable cover so that it can be carried in a pocket or purse. A clip is provided for carrying the lever in a pocket of a garment.

The invention is directed at protecting vehicles such as automobiles, trucks, buses, and the like, from theft in a relatively simple manner. It avoids the use of alarms, chains, external locks, and other conventional anti-theft devices. The transmission can be locked and protected even while the motor of the vehicle is running, while the transmission is in neutral or parking position. Thus, even though a thief may manage to obtain the ignition key of the vehicle or to bypass the ignition circuit by crossing wires, he still cannot operate the vehicle because the transmission has been effectively locked and protected.

Various objects, features and advantages of the invention will become apparent upon reading the following specification together with the accompanying drawing forming a part thereof.

Referring to the drawing:

FIG. 3 is an enlarged fragmentary cross-sectional view taken on line 3—3 of FIG. 2, showing details of the transmission lock and further showing the shift lever removed from the lock to effect locking of the transmission.

FIG. 4 is a sectional view similar to FIG. 3, showing the shift lever engaged with the transmission lock to effect unlocking of the transmission.

FIG. 6 is an exploded perspective view of parts of the transmission lock.

FIG. 7 is a sectional view similar to FIG. 3, showing a modification in which a dial combination lock and plug is provided for the transmission lock as a further security measure.

FIG. 8 is a side view of the combination lock and plug taken on line 8—8 of FIG. 7.

FIG. 9 is a perspective view of the plug of FIGS. 7 and 8 on an enlarged scale.

FIG. 10 is a perspective view of a dial of the combination lock.

FIG. 11 is a side view of a floor mounted transmission console provided with the transmission locking device.

FIG. 12 is a top view of the transmission console of FIG. 11.

FIG. 14 is an enlarged side view of the shift lever per se of FIG. 13.

FIG. 15 is a front view of a push button assembly of an automatic transmission provided with a locking device according to the invention.

The invention will be explained in the following detailed description with particular reference to an automatic shift. However, it will be understood that the invention is equally applicable to a manual shift.

Figure 1:
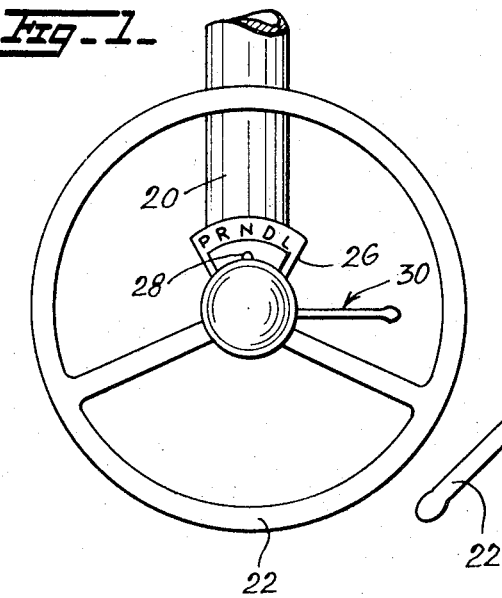
FIG. 1 is a top view of a steering wheel and part of a steering column or post of a vehicle with a locking device for a transmission mounted on the steering column.
Figure 2:
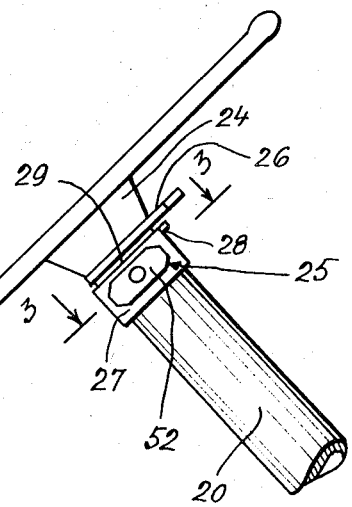
FIG. 2 is a side view of the steering wheel and steering column and transmission locking device of FIG. 1, but with shift lever removed.

Referring first to FIGS. 1 and 2, there is shown the steering column 20 of a vehicle on which is rotatably mounted a conventional steering wheel 22. Under the hub 24 of the steering wheel is a stationary arcuate escutcheon plate 26 with shift positions of the automatic transmission of the vehicle indicated by the standard sequence P–R–N–D–L. A pointer 28 is carried by a rotatable shift collar 27 mounted on the stationary column 20 and engaged with stationary bearing 29 in conventional manner. Now according to the invention, the cylindrical shift collar is provided with a transmission locking assembly 25 shown to best advantage in FIGS. 3 and 4. The assembly includes a locking shift lever 30 shown to best advantage in FIGS. 3, 4 and 5.

The shift lever 30 includes a shaft 32 terminating at one end in a tapered knob 33. At its other end the shaft has an integrally formed flat key 40. The key is elongated and is provided with serrations at its two opposite edges 42 for operating a cylindrical lock 50 further described below. Adjacent key 40 is a short cylindrical section 44 and adjacent section 44 is a cylindrical threaded section 46 slightly larger in diameter than the width of key 40. Section 46 adjoins a tapered section 48 which is integral at its wider end with the long tapered section 49 of shaft 32. The entire lever 30 can be made of a single piece of steel, bronze or other suitable rigid material. The lever can be finished in different colors or it can be chrome plated.

It will be noted in FIGS. 1 and 4 that the lever extends radially outward of the steering column 20 and shift collar 27 when engaged with the transmission lock 50. The transmission locking assembly 25 further includes an arcuate generally rectangular plate 52 preferably chrome plated. Plate 52 is secured to the exterior of the shift collar 27 by bolts 54 shown in FIGS. 3 and 4 engaged in threaded blind cores 55 in the plate. Plate 52 tapers in thickness away from its thicker center portion toward its ends. In the center of the plate is a tapered hole 56 shaped to receive snugly the tapered section 48 of lever 30. The collar 25 is formed with a threaded hole 58 axially aligned with the hole 56 to receive and engage the threaded section 46 of lever 30. Key 40 fits into keyhole 60 of lock 50 (see FIGS. 2 and 6).

Lock 50 has a cylinder 62 with conventional internal pins (not shown) which are engaged by the serrations at opposite edges of key 40 so that cylinder 62 will rotate freely in cylindrical casing 64 when the key is fully inserted in the lock. A short, flat bar 66 extends out of the inner end of cylinder 62 and rotates therewith when the cylinder rotates in casing 64. Casing 64 is slidably fitted in a cylindrical bore 70 in the collar 27. The casing has a lateral key 72 which fits slidably in lateral groove 74 of bore 70 so that the casing slides axially without rotating. The lock 50 is retained in bore 70 by a ring nut 75. The nut is externally threaded to engage in the inner threaded end of bore 70. The nut has an internal thread 76 which receives a threaded cylindrical plug 80. Plug 80 has a central rectangular bore 82 which receives bar 66 so that plug 80 rotates with cylinder 62.

Disposed inwardly of the collar 27 is transmission shift ring 84 provided with a cylindrical radial recess 86 to receive plug 80 when it is advanced axially inward as shown in FIG. 4. A conventional shift position selector arm 88 extends radially inward of ring 84. Ring 84 rotates with collar 27 when plug 80 is engaged in recess 86 and when lever 30 is turned circumferentially of the steering column 20 to turn collar 27. Plug 80 thus serves as a coupling member between collar 27 and ring 84. Recess 86 is preferably located at the N or neutral position of the shift ring and shift selector arm as indicated in FIG. 3.

In operation of the transmission locking assembly 25, removal of lever 30 effects disengagement of the collar 27 from ring 84 so that the selector arm 88 cannot be turned. This is considered the locked condition of the transmission. Full insertion and engagement of the shift lever 30 effects engagement between collar 27 and ring 84 by plug 80 so that the selector arm 88 can be turned. This is considered the unlocked condition of the transmission.

FIG. 3 shows that when the lever 30 is removed from the lock 80, casing 64 is at the outer end of bore 70 and plug 80 is retracted from ring 84. When the lever is inserted into the lock, key 40 first enters keyhole 60 so that the cylinder 62 is free to turn. The cylindrical section 44 of the lever abuts the outer end of cylinder 62 and the threaded section 46 is at the outer end of threaded hole 58. Now, when the lever 30 is turned on its axis the threaded section 46 screws into hole 58. At the same time casing 64 with cylinder 62 advances axially inward of bore. Cylinder 62 is then turning bar 66 which is rotating plug 80. Plug 80 thus advances axially into recess 86 in ring 84. When the lever 30 is fully inserted as shown in FIG. 4, the collar 27 and ring will rotate together to the several shift positions of the transmission. It will be apparent that the lever 30 can be removed at any shift position. However, the only practical and safe positions will be the parking and neutral positions at which the motor of the vehicle can be left running if desired for warming up the engine, for temporary stopping or other purposes.

If an unauthorized person tries to push the lock 50 axially inward from its position in FIG. 3 by inserting a tool such as a screwdriver into hole 56, the lock will not move since plug 80 cannot move axially inward unless cylinder 62 is turned. Cylinder 62 can turn only when a proper key is inserted in keyhole 62. Thus, the vehicle is protected against unauthorized operation of the shift mechanism.

Figure 5:
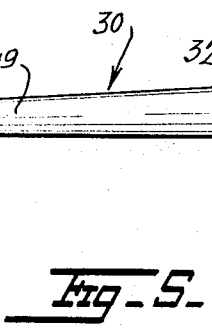
FIG. 5 is a side view of the transmission locking lever per se, shown with an associated protective cap in perspective view, parts of the cap being broken away.

A removable tapered protective cap 90 open at wider end 91 can be provided for the lever 30 as shown in FIG. 5. This cap has a tapered bore 92 to receive the tapered section 49 of lever 30. A threaded section 94 of bore 92 engages the threaded section 46 of lever 30 so that the cap can be securely engaged on the lever with key 40 concealed and protected inside the cap. A spring clip 95 on the cap can engage over the edge of a garment pocket so that the lever can be carried safely exposed or concealed about the person.

It may be desirable in some installations to protect and conceal lock 50 so that an unauthorized person cannot tamper with the lock or even operate this lock should he somehow acquire lever 30 with proper key 40. FIGS. 7–10 show a protective locking means for the transmission locking assembly. Plate 52' replaces plate 50 of FIGS. 2–4. Plate 52' is formed with an opening 96 in which is block 98 of a combination lock 100. Block 98 is fitted in shell 99. Flange 97 engages the rim of opening 96. Rotatably disposed in shell 99 are three disks or dials 102, 104 and 106. Each disk has an outer serrated edge 108 exposed at a different cutout portion 110 in a stepped portion of the shell. Thus, the disks which are of different diameter can be independently rotated. Numerals 112 are inscribed near the periphery of each disk and these numerals are successively exposed in openings 114 formed in the shell. The openings 114 are aligned radially of the lock. Each disk has a pair of notches 115 formed in diametrically opposite positions in central hole 116 of the disk. Plug 120 has a cylindrical body 122 formed with a pair of diametrally aligned keys 124 which can pass through notches 115 of the disks when the notches are disposed in registration with each other. Plug 120 has a head 121 which abuts the outer smaller disk 102. It has a knob 125 so that it can be grasped manually.

It will be apparent that when the proper combination of numerals 112 appear at openings 114, notches 115 will be in proper registration so that plug 120 can be inserted in or removed from the combination lock 100. When the plug is in place, as shown in FIGS. 7 and 8, then an unauthorized person cannot reach lock 50 to tamper therewith. Only one who knows the assigned numerical combination can properly position the disks for removal of plug 120. When the plug is removed the shift lever 30 can be inserted in the manner described in connection with FIGS. 1–6. In the assembly of FIGS. 7 and 8, tapered hole 56' is formed in block 98 to receive the tapered section 48 of lever 30. Other parts of the transmission assembly are the same as previously described and identically numbered.

The transmission locking assembly has been described in connection with a lock mounted in the rotatable collar 27 on a steering column. The assembly can of course be installed in a floor mounted transmission console 150 as indicated in FIGS. 11 and 12. Shift leevr 30 is shown removably mounted in place for advancing the shift arm 152 to select shift positions of the standard sequence P–R–N–D–L. Operation of the transmission locking assembly will otherwise be substantially identical as previously described.

Figure 13:
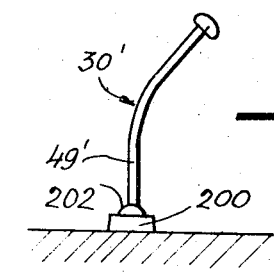
FIG. 13 is a side view of another shift lever according to the invention used for operating a manual shift in a vehicle.

FIGS. 13 and 14 show key shift lever 30' which is adapted for use with a standard manual shift 200. Parts of the lever corresponding to lever 30 are identically numbered. Lever 30' has an elongated bent shaft 49' and and terminates in a large round knob 33'. The lever is removable from the lock which will be installed in ball 202 of the shift mechanism.

FIG. 15 shows part of a push button automatic shift assembly in which push buttons 206 have the standard P–R–N–D–L arrangement. Lever 30 can be inserted into lock 50' which will extend transversely of the push buttons and arranged to release them for operation when the lever is fully inserted and turned in the lock. When lever 30 is removed, the push buttons will all be locked and cannot be operated.

In all forms of the invention, the owner and/or operator of a vehicle is assured that the vehicle cannot be stolen or used by an unauthorized person when the removable shift lever is removed. This relatively simple arrangement makes it unnecessary to employ any of the complicated, expensive, easily defeated security systems heretofore employed to prevent theft of vehicles.

I claim:

1. A locking device for the transmission of an automotive vehicle, comprising an interior transmission member movable to a plurality of positions for shifting the transmission; an exterior shift member disposed adjacent to the transmission member; a key operated lock disposed inside said shift member and spaced from its exterior to conceal the lock; a coupling member carried by said shift member and engaged with said lock; said coupling member being movable between extended and retracted positions respectively by operation of the lock, said coupling member engaging the transmission member in the extended position to unlock the transmission and disengaging from the transmission member in the retracted position to lock the transmission; and a shift lever having an elongated shaft engageable with the shift member for moving the same, and a key at one end of the shaft insertable through the shift member into said lock to operate the same for extending the coupling member when the key is inserted in the lock to unlock the transmission so that the transmission and shift members can be shifted by lateral movement of the shift lever, and for retracting the coupling member to lock the transmission when the key is removed from the lock.

2. A locking device for a transmission as defined in claim 1, wherein said lock comprises a cylindrical casing; a cylinder having a keyhole, said cylinder being rotatably disposed in said casing and rotatable only when said key is inserted in the keyhole; said shift member comprising a collar having a radial bore therein, said casing being axially slidable in said bore, said collar having a portion arranged to engage and support a portion of the shaft adjacent to the key while the shift lever extends radially of the collar; said transmission member comprising a shift ring disposed concentrically within said collar and having a radial recess formed therein; said coupling member comprising a plug engaged with said cylinder to rotate therewith and to advance axially into said recess, whereby the collar and shift ring turn circumferentially when the key is engaged in the cylinder, when said portion of the shaft is engaged with said portion of the collar, and when the lever is turned laterally circumferentially around the axis of the collar and ring, and whereby said plug retracts from said recess to disengage the collar from the ring when the key is removed from the cylinder.

3. A transmission locking device as defined by claim 2, further comprising a ring nut holding the lock in said bore, said nut having internal threading, said plug having external threading engaged with the internal threading of the nut, whereby rotation of the plug by the cylinder moves the plug axially in said nut to engage in and disengage from said recess.

4. A transmission locking device as defined by claim 2, further comprising an arcuate plate affixed to said collar, said plate having a tapered hole aligned with said threaded hole in the collar, said shaft having a tapered section to seat in said tapered hole when the threaded section is fully engaged in said threaded hole.

5. A transmission locking device as defined by claim 2, further comprising an arcuate plate affixed to said collar, said plate having opening aligned with said threaded hole in the collar, a numerical, multiple dial combination lock secured in the opening in the plate, said combination lock having a central hole removably receiving a plug to cover and conceal said cylinder.

References Cited
UNITED STATES PATENTS

| | | | |
|---|---|---|---|
| 1,398,455 | 11/1921 | De Clairmont | 70—204X |
| 1,434,709 | 11/1922 | Keri | 70—412X |
| 1,438,336 | 12/1922 | Schroeder | 70—393X |
| 1,581,285 | 4/1926 | Page | 70—204 |
| 2,208,498 | 7/1940 | Cramer | 70—393X |
| 2,293,197 | 8/1942 | Dorr | 70—204 |

MARVIN A. CHAMPION, Primary Examiner

A. G. CRAIG, Jr., Assistant Examiner

U.S. Cl. X.R.

70—247, 402, 412